United States Patent
Beers et al.

(10) Patent No.: US 9,404,811 B2
(45) Date of Patent: Aug. 2, 2016

(54) MOTOR HOUSING THERMAL SENSING

(75) Inventors: Craig M. Beers, Wethersfield, CT (US); John H. Paliulis, South Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 901 days.

(21) Appl. No.: 13/252,845

(22) Filed: Oct. 4, 2011

(65) Prior Publication Data
US 2013/0084193 A1    Apr. 4, 2013

(51) Int. Cl.
F04B 49/06 (2006.01)
H02K 11/00 (2016.01)
G01K 13/00 (2006.01)
F04D 17/12 (2006.01)
F04D 25/06 (2006.01)
F04D 27/00 (2006.01)

(52) U.S. Cl.
CPC ............... G01K 13/00 (2013.01); F04D 17/12 (2013.01); F04D 25/0606 (2013.01); F04D 27/001 (2013.01); G01K 2205/00 (2013.01)

(58) Field of Classification Search
CPC ...... F04D 17/12; F04D 25/0606; G01K 13/00
USPC ......... 417/44.1, 212, 213, 53, 63, 350, 423.5, 417/423.8; 310/68 B, 68 C
See application file for complete search history.

(56) References Cited

U.S. PATENT DOCUMENTS

| | | | |
|---|---|---|---|
| 4,119,184 A | 10/1978 | Mower et al. | |
| 4,555,645 A * | 11/1985 | Atkinson | H02K 33/18 310/13 |
| 4,833,888 A * | 5/1989 | Kerner | B01D 61/08 62/3.3 |
| 5,201,796 A | 4/1993 | Glinski et al. | |
| 5,249,934 A | 10/1993 | Merritt et al. | |
| 5,402,636 A | 4/1995 | Mize et al. | |
| 5,469,713 A * | 11/1995 | Wardle | F04C 29/02 62/193 |
| 5,921,683 A | 7/1999 | Merritt et al. | |
| 5,947,248 A | 9/1999 | Link | |
| 6,129,193 A | 10/2000 | Link | |
| 6,230,866 B1 | 5/2001 | Link | |
| 7,654,804 B2 * | 2/2010 | Chu | F04C 18/0215 417/44.2 |
| 2002/0076336 A1* | 6/2002 | Mruk | F04D 25/06 417/350 |
| 2004/0020227 A1* | 2/2004 | Takemoto | F25B 31/006 62/229 |
| 2004/0081560 A1* | 4/2004 | Blumenthal | F04D 19/042 417/32 |
| 2006/0158049 A1* | 7/2006 | Suzuki | H02K 11/0073 310/52 |
| 2009/0136335 A1* | 5/2009 | Nakazeki | F16C 19/52 415/13 |
| 2011/0113809 A1* | 5/2011 | Adaniya | B60K 1/00 62/324.6 |
| 2012/0274256 A1* | 11/2012 | O'Rourke | H02K 9/06 318/473 |

* cited by examiner

Primary Examiner — Peter J Bertheaud
Assistant Examiner — Dominick L Plakkoottam
(74) Attorney, Agent, or Firm — Cantor Colburn LLP

(57) ABSTRACT

A motor driven compressor apparatus includes a first stage compressor, a second stage compressor, an electric motor disposed between and coupled to the first stage compressor and the second stage compressor, thermal sensors disposed on the electric motor and configured to externally measure internal temperatures of the electric motor or internal bearings or components, and an external controller coupled to the electric motor and to the thermal sensors, and configured to at least one of slow down a speed of the electric motor and shut down the electric motor in response to at least one of an excess of a predetermined internal temperature and a rate of internal temperature change.

10 Claims, 5 Drawing Sheets

MOTOR HOUSING THERMAL SENSING

BACKGROUND OF THE INVENTION

The present invention relates to motors and generators, and more specifically, to thermal sensors for motors and generators to externally detect internal heat.

Motor driven compressors, typically used on aircraft, produce pressurized air which is routed to air separation modules in nitrogen generation systems for nitrogen enrichment. The nitrogen-enriched air is then distributed into the main and center fuel tanks to maintain a required inerting level. The motor driven compressors are typically mounted to a fuselage fairing, which is considered a flammable leakage zone as it can potentially release fuel vapors. Bearing (air or thrust) failures in the motor driven compressors can cause the housing to overheat to temperatures that are of concern in aircraft fuel vapor zones. As such, it is desirable to monitor the motor driven compressors for overheating.

BRIEF DESCRIPTION OF THE INVENTION

Exemplary embodiments include a motor driven compressor apparatus, including a first stage compressor, a second stage compressor, an electric motor disposed between and coupled to the first stage compressor and the second stage compressor, thermal sensors disposed on the electric motor and configured to externally measure internal temperatures of the electric motor, and an external controller coupled to the electric motor and to the thermal sensors, and configured to slow down a speed of the electric motor or shut down the electric motor in response to the thermal sensors measuring an internal temperature in excess of a predetermined temperature or when the internal temperature increases at a rate in excess of a predetermined rate.

Additional exemplary embodiments include a temperature sensing apparatus for a motor driven compressor, the apparatus including sensor pads configured to be affixed within a depression on the electric motor of the motor driven compressor, and further thermally coupled to the electric motor, and lead lines coupled to the sensor pads and configured to be coupled to an external controller configured to monitor an internal temperature of the electric motor.

Further exemplary embodiments include a method for sensing an internal temperature in an electric motor for a motor driven compressor, the method including positioning a thermal sensor on the electric motor, coupling the thermal sensor to an external controller configured to control the speed of the electric motor and measure the internal temperature, and slow downing a speed of the electric motor or shutting down the electric motor in response to the thermal sensors measuring an internal temperature in excess of a predetermined temperature or when the internal temperature increases at a rate in excess of a predetermined rate.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
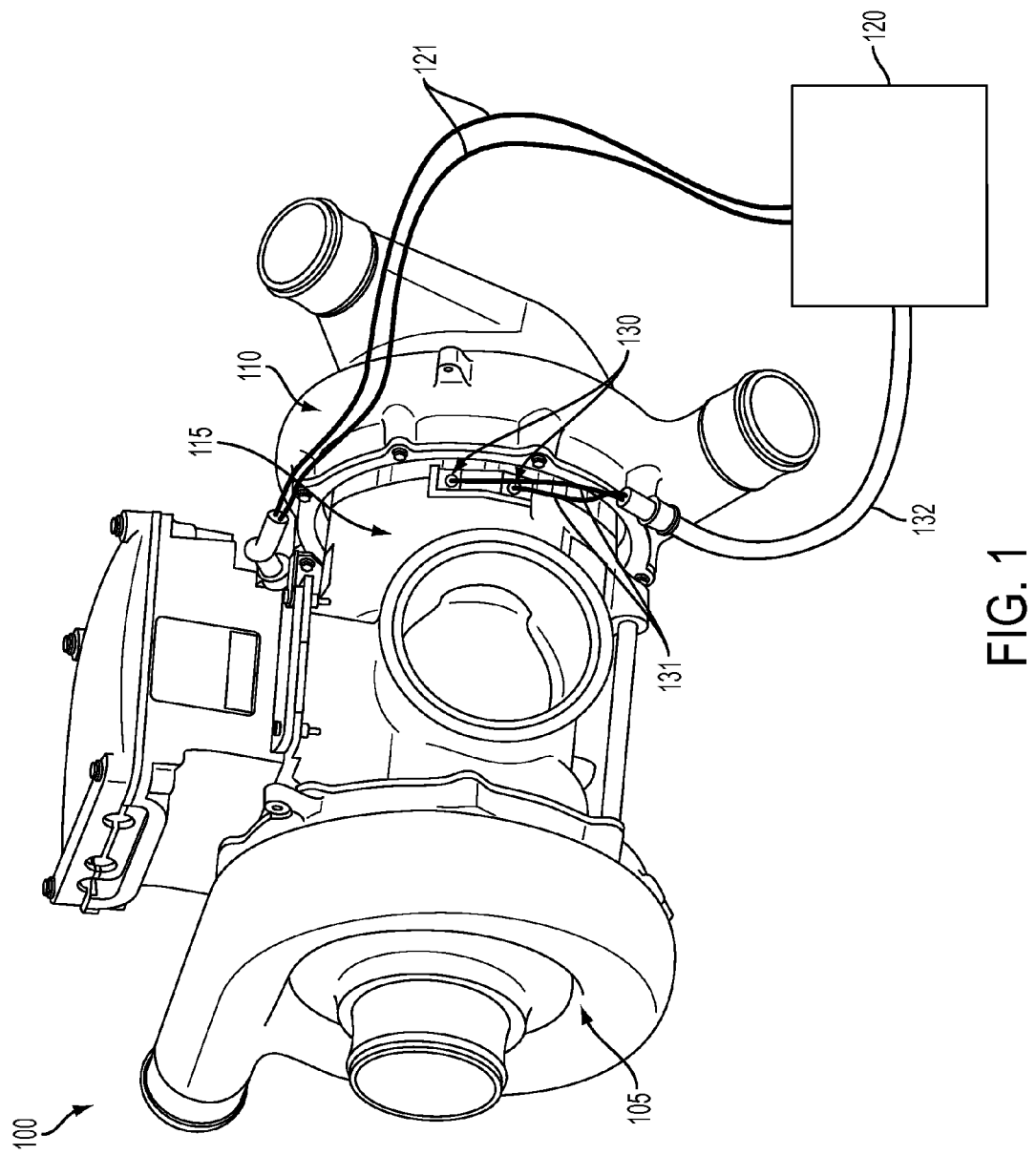
FIG. 1 illustrates a motor driven compressor apparatus in which excessive internal heat can be detected externally, in accordance with one embodiment.

FIG. 1 illustrates a motor driven compressor apparatus 100 in which excessive internal heat can be detected externally, in accordance with one embodiment. Several details of the system have been eliminated for illustrative purposes. It will be appreciated that the motor driven compressor apparatus 100 is an illustrative example. Many other types of motor and generators that include internal bearings or components that can fail and generate heat that can be detected externally are contemplated in other embodiments. The apparatus 100 illustrated in FIG. 1 is a motor driven system having a two-stage compressor. As such, the apparatus 100 includes a first compressor stage 105 and a second compressor stage 110. In one embodiment, the first and second compressor stages 105, 110 are centrifugal compressors which utilize low solidity diffusers to maximize operating range. The apparatus 100 further includes an electric motor 115. In one embodiment, the electric motor 115 includes a three-phase stator with a two-pole permanent magnet rotor. An external controller 120 can be implemented for several control features of the apparatus 100 such as temperature sensing and speed control as further described herein. In one embodiment, the external controller 120 controls the speed of the electric motor via control lines 121. As described herein, overheating in the apparatus 100 is a concern because motor driven compressors are often close to fuel vapors. One potential source of overheating in the motor driven compressor apparatus are failed internal thrust bearings as further described herein. As such, in one embodiment, the apparatus 100 includes one or more thermal sensors 130 that are in thermal communication with the electric motor 115 via lead wires 131 supported in a wire harness 132.

Figure 2:
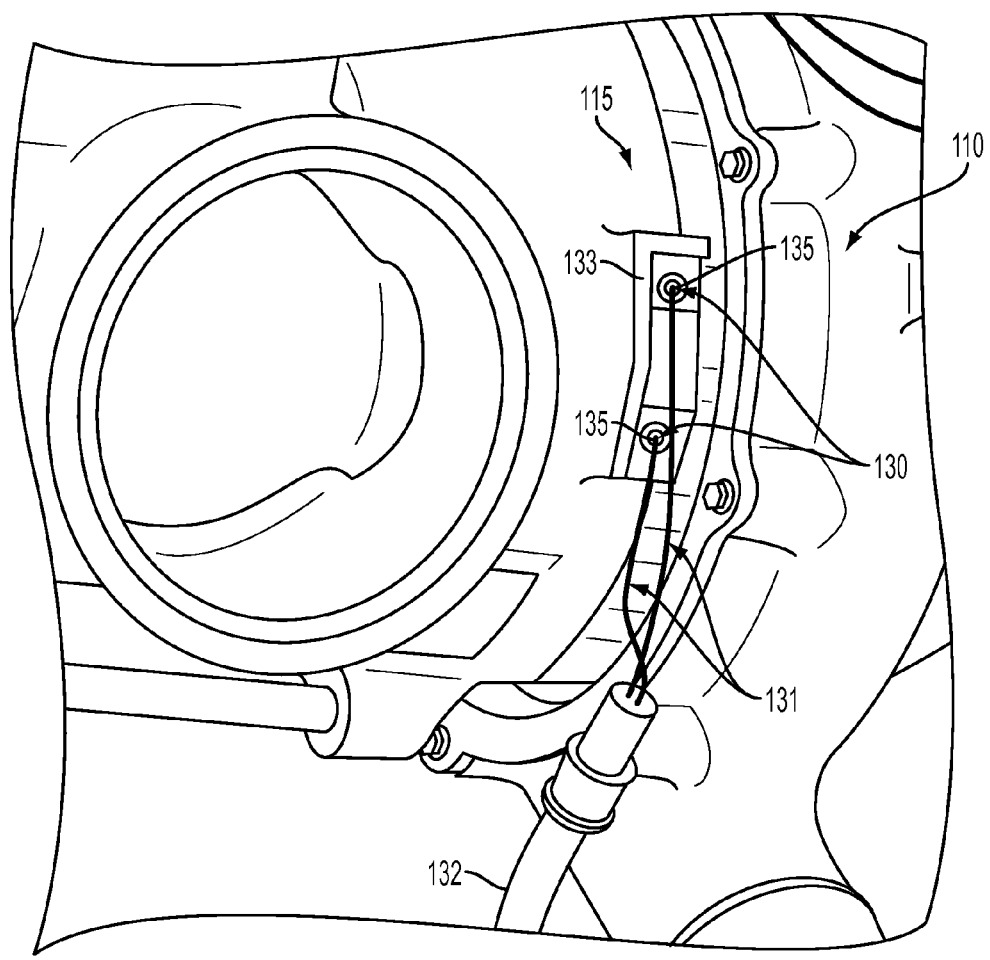
FIG. 2 is a close-up view of a portion of the motor driven compressor apparatus of FIG. 1 that illustrates the thermal sensors utilized in accordance with one embodiment.

FIG. 2 is a close-up perspective view of the thermal sensors 130 of FIG. 1, illustrating further detail. In one embodiment, the electric motor can include a depression 133 into which each thermal sensor 130 is disposed. Each thermal sensor 130 includes a sensor pad 135 that is in thermal communication with the electric motor 115 via the depression 133. In one embodiment, the thermal sensors 130 are thermally coupled to the electric motor 115 via thermal epoxy. The thermal sensors 130 can be any suitable thermal detector such as but not limited to thermal couples. The thermal data can then be communicated to the external controller 120, which can take subsequent action as further described herein. It can thus be appreciated that the thermal sensors 130 can detect internal heat within the electric motor 115. The internal heat can be from any source within the electric motor 115. For example, the internal heat can be from failed thrust bearing as now described.

Figure 3:
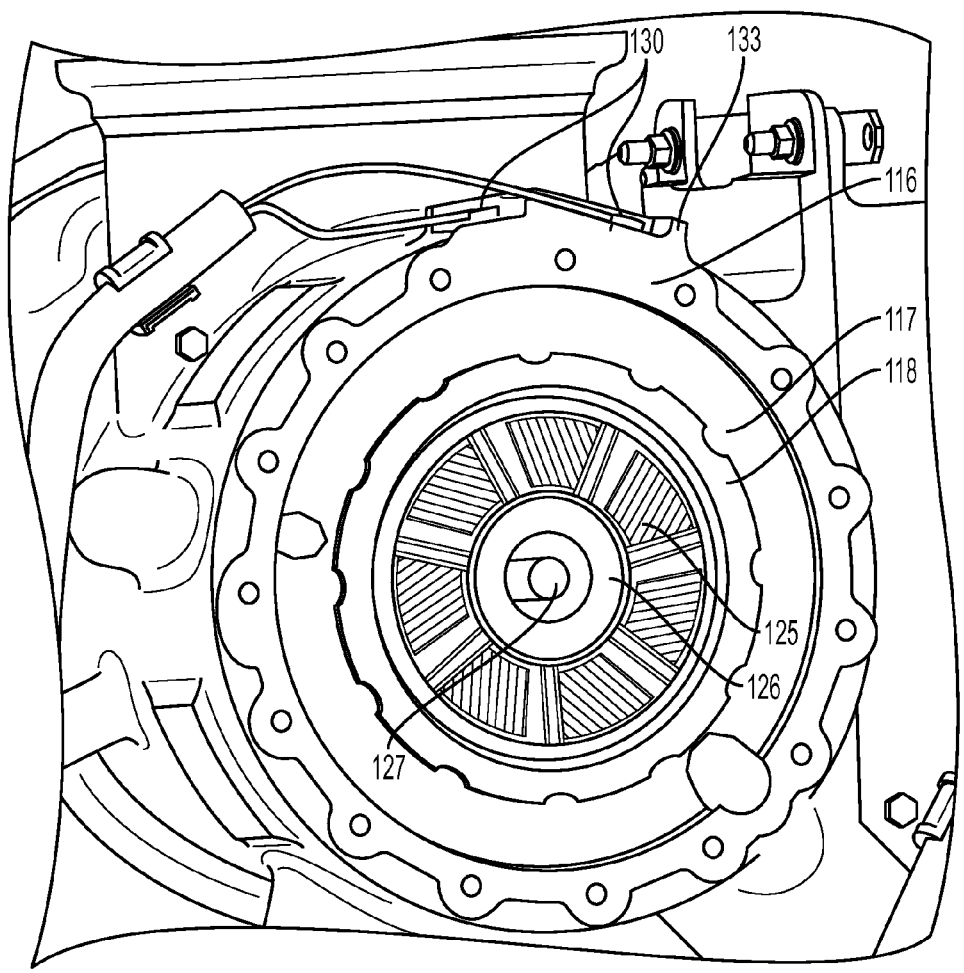
FIG. 3 is a cut-away front perspective view of the motor driven compressor apparatus of FIG. 1.

FIG. 3 is a cut-away front perspective view of the motor driven compressor apparatus 100 of FIGS. 1 and 2. The internal view shows that the electric motor 115 includes an external housing 116 and an internal housing 118 with a support disk 117 between the external and internal housings 116, 118. It can further been seen that the depression 133 is formed in the external housing 116. The electric motor 115 further includes a shaft 126 that is coupled to shafts disposed in one or both the first compressor stage 105 and the second compressor stage 110. The shaft 126 as well as the shafts of the first compressor stage 105 and the second compressor stage 110 are restrained by a centrally located tie rod 127 to ensure that the shaft 126, and the shafts of the first compressor stage 105 and the second compressor stage 110 act as a single unit. It can be appreciated that the shaft 126 is part of a larger shaft assembly that is not discussed. The shaft 126 is supported by several bearings including thrust bearings 125 that surround the shaft 126. The thrust bearings 125 react to operating loads in the axial direction of the shaft 126. The thrust bearings 125 are located and positioned within precision machined and aligned aluminum housings. Operating speeds of the apparatus 100 can be between about 40,000 rpm and about 82,000 rpm. If the thrust bearings 125 fail, the shaft 126 and other shaft component continue to rotate at the stated speeds and can rapidly heat up to temperatures unsuitable for any fuel vapor that may be present. The depression 133 is formed in a location in the external housing 116 radial from the internal position of the thrust bearings 125 where the thermal sensors 130 can sense the internal heat.

Figure 4:
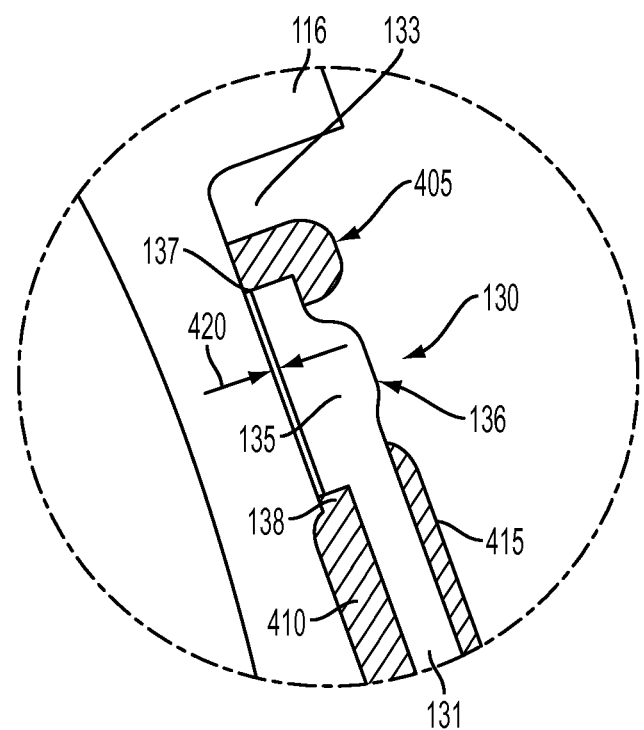
FIG. 4 is a simulated view of heat that can be generated when a thrust bearing fails.

FIG. 4 illustrates a close-up view of the thermal sensor 130 having the thermal sensor pad 135 and a thermal sensor button 136. As described herein, the thermal sensor 130 is disposed in the depression 133 on the external housing 116. FIG. 4 further illustrates that the thermal pad 135 has a forward end 137 and a lead end 138 that is coupled to the lead line 131. As described herein, the thermal sensors 130 are coupled to the external housing 116 via thermal epoxy. In one embodiment, the thermal pad 135 is affixed within the depression 133 with a layer 420 of epoxy of approximately 0.005" (0.127 mm) The thermal pad 135 is also affixed within the depression via a layer 405 of epoxy approximately 0.060" (1.524 mm) wide and approximately 0.120" (3.048 mm) deep at the forward end 137. In addition, the lead line 131 can be affixed to the external housing 116 via epoxy layers 410, 415.

Figure 5:
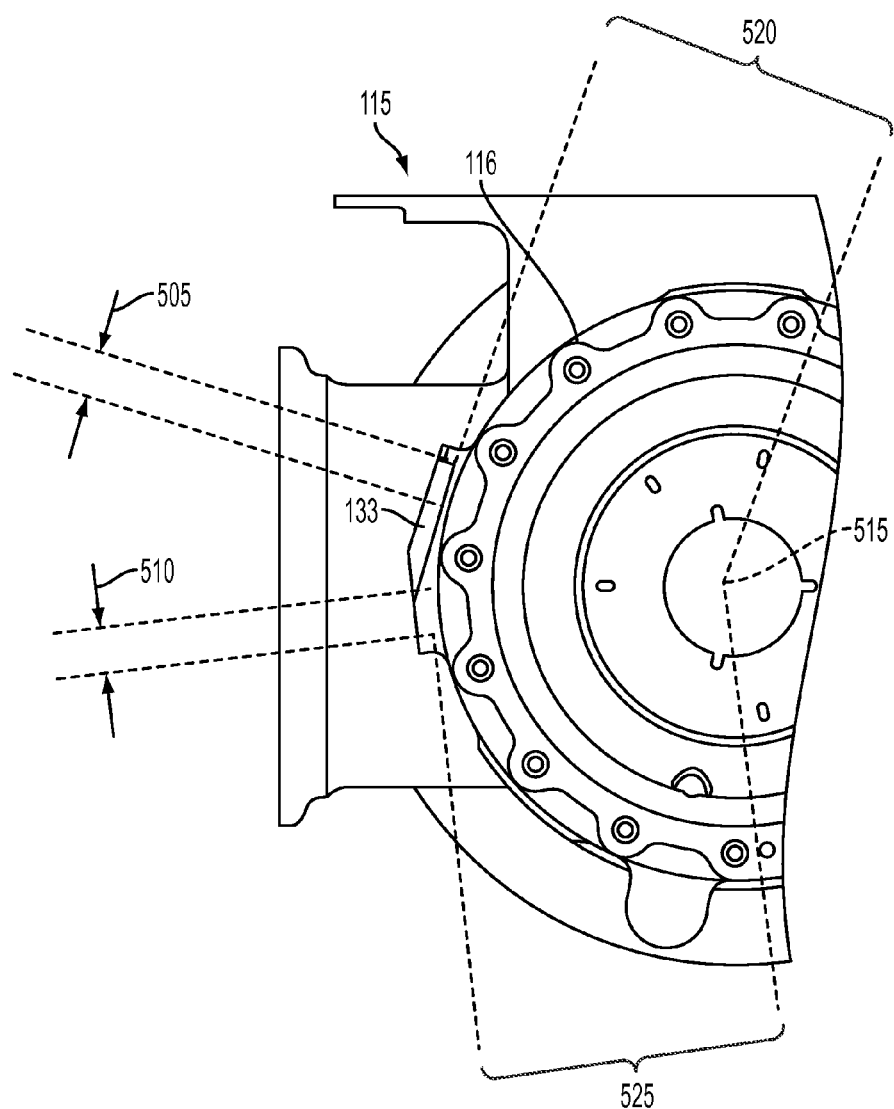

FIG. 5 illustrates another view of the electric motor 115 and the depression 133 disposed in the external housing 116. In one embodiment, the thermal sensors 130 are approximately 0.0410" (10.414 mm) long and can be disposed in two positions 505, 510 within the depression 133. As also illustrated each of the selected positions 505, 510 is offset from a centerline 515 of the electric motor 115 by approximately 2.93" (74.422 mm) as shown by radial offsets 520, 525.

As described herein and as illustrated in FIGS. 1-2, the thermal sensors 130 are configured to measure the internal temperature that is thermally transmitted through the housings 116, 118 of the electric motor 115 or internal bearings or components to the depression 133, through the thermal sensor pads 135. The thermal data is transmitted to the external controller 120 via the lead wires 131. As described herein, the external controller 120, among other things, controls the speed of the electric motor 115. The external controller 120 also monitors the internal temperature of the electric motor or internal bearings or components via the thermal sensors 130. In one embodiment, if the internal temperature of the electric motor or internal bearings or components exceeds a predetermined temperature, the external controller 120 either reduces the speed of the electric motor 115 or shuts down the electric motor 115 entirely. The external controller 120 is also configured to generate an alert to indicate that the internal temperature has exceeded the pre-determined temperature (e.g., 450° F. (232° C.), which is indicative of a thrust bearing 125 failure as described herein. In another embodiments, the external controller 120 can monitor the temperature over time. If the temperature rises at a certain rate, that is, a predetermined temperature rise over a predetermined period of time, the external controller 120 can either reduce the speed of the electric motor 115 or entirely shut down the electric motor 115. The rate of increase of internal temperature (e.g., 200° F. (93° C.) over 16 seconds) is also indicative of a failed thrust bearing 125. The external controller 120 an also generate an alert for this condition as well.

The external controller 120 can be a hardware device for executing software. The external controller 120 can be any custom made or commercially available processor, a central processing unit (CPU), an auxiliary processor among several processors associated with a computer, for example, a semiconductor based microprocessor (in the form of a microchip or chip set), a macroprocessor, or generally any device for executing software instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A motor driven compressor apparatus, comprising:
a first stage compressor;
a second stage compressor;
an electric motor disposed between and coupled to the first stage compressor and the second stage compressor;
thermal sensors disposed in a depression of a housing of the electric motor and configured to externally measure internal temperatures of the electric motor or internal bearings or components,
wherein the thermal sensors further comprise sensor pads disposed in the depression, each sensor pad has a forward end and a lead end that is coupled to a lead line,
wherein the depression is radially aligned with the internal bearings,
an external controller coupled to the electric motor and to the thermal sensors, and configured to slow down a speed of the electric motor or shut down the electric motor in response to the thermal sensors measuring an internal temperature in excess of a predetermined temperature or when the internal temperature increases at a rate in excess of a predetermined rate,
wherein the sensor pads are coupled to the housing with thermal epoxy,
wherein the thermal epoxy includes first and second portions per sensor pad,
wherein the first portion affixes the lead end to a surface of the depression,
wherein the second portion affixes the forward end to the surface of the depression.

2. The apparatus as claimed in claim 1 wherein the housing comprises an external housing and an internal housing, wherein the external housing includes the depression.

3. The apparatus as claimed in claim 1 wherein the sensor pads are coupled to the housing with thermal epoxy.

4. The apparatus as claimed in claim 1 wherein the external controller is coupled to the thermal sensors via the lead lines coupled to the sensor pads.

5. The apparatus as claimed in claim 1 wherein the electric motor comprises an internal shaft coupled to the first and second compressor stages.

6. The apparatus as claimed in claim 5 wherein the internal bearings comprise thrust bearings coupled to the internal shaft.

7. The apparatus as claimed in claim 1 wherein each thermal sensors is 0.0410" (10.414 mm) long.

8. The apparatus as claimed in claim 1 wherein the thermal sensors are radially offset from a centerline of the electric motor.

9. The apparatus as claimed in claim 1 wherein the internal bearings comprise thrust bearings operating in a fuel vapor zone of an aircraft.

10. The apparatus as claimed in claim 1 wherein the first portion is approximately 0.005" (0.127 mm) deep and the second portion is approximately 0.060" (1.524 mm) wide and approximately 0.120" (3.048 mm) deep.

* * * * *